(12) United States Patent
Moszoro et al.

(10) Patent No.: US 7,934,460 B2
(45) Date of Patent: May 3, 2011

(54) ELECTROPNEUMATIC INSTALLATION APPLIED TO SEEDERS HAVING INDEPENDENT UNITS ASSOCIATED TO PNEUMATIC SEED DOSING DEVICES

(76) Inventors: Antonio Romano Moszoro, Rosario (AR); Bartolome Estanislao Moszoro, Rosario (AR)

( * ) Notice: Subject to any disclaimer, the term of this patent is extended or adjusted under 35 U.S.C. 154(b) by 718 days.

(21) Appl. No.: 11/566,267

(22) Filed: Dec. 4, 2006

(65) Prior Publication Data

US 2007/0266918 A1    Nov. 22, 2007

(30) Foreign Application Priority Data

Apr. 20, 2006 (AR) ............................... 20060101564

(51) Int. Cl.
*A01C 7/20* (2006.01)
(52) U.S. Cl. ............. 111/174; 111/200; 701/50; 406/12
(58) Field of Classification Search ................... 111/200, 111/900, 170, 174, 176, 177, 903, 904; 701/50; 340/684, 673, 674; 172/2–7; 406/26, 10, 406/12, 120, 197
See application file for complete search history.

(56) References Cited

U.S. PATENT DOCUMENTS

| | | | | |
|---|---|---|---|---|
| 6,584,920 B1 * | 7/2003 | Cresswell | ...................... | 111/174 |
| 6,892,909 B1 * | 5/2005 | Hebert et al. | .................. | 222/637 |
| 6,935,256 B1 * | 8/2005 | Meyer | .......................... | 111/174 |
| 2005/0028713 A1 * | 2/2005 | McCartney | .................... | 111/174 |
| 2005/0028714 A1 * | 2/2005 | Hagen et al. | .................... | 111/174 |

FOREIGN PATENT DOCUMENTS

| | | | |
|---|---|---|---|
| DE | 19837757 A1 | * | 2/2000 |
| EP | 1504642 A1 | * | 2/2005 |
| EP | 1847167 A1 | * | 10/2007 |

* cited by examiner

*Primary Examiner* — Christopher J. Novosad
(74) *Attorney, Agent, or Firm* — Collen IP; Donald J. Ranft

(57) ABSTRACT

Installation to be applied to self-propelled or tow-type agricultural seeders that comprises a general command central unit (5) fed from an electric power source and controls a corresponding individual control unit (10) that regulates the operation of the electro-pneumatic unit (6) associated to the seed dosing devices within the seeder to perform the pneumatic action. Electro-pneumatic unit may be a motor suction or a motor compressor unit. The invention envisages the association of these units to all the dosing devices in a seeding body of the seeder, to pairs of dosing units in the seeder, or else, on an individual basis, to each seed dosing device of the seeder.

7 Claims, 3 Drawing Sheets

ELECTROPNEUMATIC INSTALLATION APPLIED TO SEEDERS HAVING INDEPENDENT UNITS ASSOCIATED TO PNEUMATIC SEED DOSING DEVICES

The main object of present invention is an electro-pneumatic installation applied to seeders, having individual units connected to pneumatic seed dosing devices, said units being driven by an electric programmed control circuit, thus enabling a more simple and direct work, at a lower installation and maintenance cost when compared to conventional hydraulically operated pneumatic seeders at presently known.

Specifically, this invention covers a novel electro-pneumatic installation specially conceived to be applied to self-propelled or tow-type agricultural seeders.

The novelty lies on the fact that the invented installation includes a plurality of motor suction or motor compressor units that may be driven by an electric, pneumatic or hydraulic motor, each of which operates in connection to at least one respective pneumatic dosing device which dispenses the seeds to be sowed.

The object of each of the aforesaid motor compressors or motor suction units is to generate the suction, vacuum or pneumatic pressure required by the associated dosing device for its operation. These are electrical drive units fed with direct current from a continuous voltage unit.

The invented installation can be equipped with a central unit wherefrom the operation of said motor compressors or motor suction units is commanded and controlled on an electronic basis.

PRIOR ART

As it is widely revealed, pneumatic seeders known at present use an hydraulic equipment that generates pneumatic pressure or vacuum for an integral operation thereof. These are complex and expensive equipment units with certain power since they must ensure the vacuum or pneumatic pressure in each of the seed dispensing-dosing devices that the machine is provided with in order to hold them up as a rotating part expels them in order.

In order to perform the functional purpose stated above, these known equipment units use hydraulic, mechanical and pneumatic elements, including fluid-tight conduits for the circulation of the several fluids.

Specifically, in the cases where a seeder is towed by an agricultural tractor, a cardan is used to impart power from the tractor's power take-off, a hydraulic pump is actuated from said cardan to control the operation of a hydraulic motor that actuates a vacuum generating turbine or compressor.

This type of hydraulic installation, as is already known, necessarily requires specific conduits for fluid circulation, with the insertion of oil coolers, filters, flow and pressure regulating valves, a storage tank, and so on.

There is a significant pneumatic circuit with trunk sections and fluid-tight bypass outlets towards each of the aforesaid seed dosing-dispensing devices, which stretches out from said vacuum generating turbine.

It should be noted then that in all these known seeders with their seed pneumatic dosing-dispensing devices, use of compression or vacuum fluid circulating from a central lung or from a machine general conduit is made.

The turbine generating such vacuum or pressure is moved through a hydraulic motor that the seeder hydraulic circuit is provided with, wherein the aforesaid hydraulic pump actuated from the tractor power take-off is also included.

Briefly, we may say that all these known installations are based on the generation of vacuum or pressure from a tow tractor power take-off, for this purpose complex mechanical and hydraulic systems requiring a hydraulic pump, an oil tank, articulated cardanic shafts, pressure regulators, flow regulators, a hydraulic motor, multiple hoses and hydraulic piping for fluid circulation, are used.

These are expensive installations requiring a great deal of maintenance in order to ensure the correct operation of all its member parts.

Many parts subject to wear and requiring periodic cleaning and replacement, e.g. oil and air filters, are used.

The required vacuum or pressure is obtained by means of complex movement systems.

For connection with the tractor power take-off, they use multiple cardanic shafts that also require maintenance and this fact causes it to be highly unsafe by reason of the multiple parts subject to wear being used. It is also highly unsafe for workers who operate the seeder machine.

The overall weight that this equipment exerts on the machine, as well as the number of parts subject to strokes, breaks and wear, is also relevant.

The known problems encountered of these machines when vacuum suction or pressure must be maintained in all its dosing devices, even when the speed decreases at the head of each batch, are also highlighted.

The greater the number of furrows covered by the seeder, the worse the drawbacks encountered, because the length of all the fluid-tight conduits must be longer, thus requiring a more powerful and larger size turbine, a fact that increases safety issues among the workers manipulating said machine.

The weather factor must also be mentioned, mainly when fluid viscosity must be maintained in low-temperature areas.

NOVELTY OF THE INVENTION—ADVANTAGES—MAIN OBJECT

The drawbacks briefly mentioned above are clearly overcome with the electro-pneumatic installation of the present invention, the special feature of which is the incorporation of a respective motor suction or motor compressor device adjacent to each dosing unit that provides the pneumatic pressure or vacuum required for its regular operation.

These motor suction or motor compressor units can be controlled from the tractor's cabin through an electric or electronic command and operation installation, operating on an individual basis over each pneumatic seed dosing device that the machine is provided with.

Thus when the installation is started, each motor suction or motor compressor unit generates the vacuum or pressure required by each pneumatic dosing device to which it is associated. When the machine stops, said devices do not necessarily stop since their operation does not depend on the forward movement of the machine or on the movement speed thereof.

If we compare this installation with that of the aforesaid known seeders, the following advantages may be mentioned:
a) Mounting simplicity, adjacent to each pneumatic dosing device;
b) Lower overall weight of the equipment, practically exerting no influence on the seeder's total weight;
c) Minimal moving means making the equipment safe;
d) Less time required for mounting the sowing system during machine manufacture.
e) Minimum down time for maintenance tasks;
f) Economy in time and maintenance expenses since there are no oil filters, leak-proof conduits and piping or other hydraulic elements and accessories combined with a piping network for the distribution of pneumatic fluid;

g) The aforesaid problems related to the tow tractor movement (batch heads) disappear since the presence of a large sized turbine the movement of which depends on the tractor rpm is deleted at source.

h) Possibility of maintaining the vacuum generating suction, even if the machine is halted;

i) Lower total power required to obtain the desired purpose, implying a significant economy in fuel.

j) All pneumatic fluid conduits and hoses are eliminated at source;

k) All hydraulic hoses, the hydraulic reservoir, radiator, filters, flow and pressure regulator, etc. are eliminated;

l) Possibility of easily regulating the operating pneumatic pressure in each dosing device.

m) Radical simplification of seeder operating system, for the benefit of the manufacturer and the user in respect of costs, features and use.

BRIEF DESCRIPTION OF THE DRAWINGS

In order to embody the advantages briefly described herein, to which many others may be added by users and experts in the art and to facilitate the understanding of constructive, constitutive and functional features of the invented electro-pneumatic installation applied to a seeder, an example of a preferred embodiment illustrated on a schematic basis and not to a predetermined scale, is described on the enclosed sheets, expressly making clear that, as it is precisely an example, the allocation of a limitative or exclusive character, as regards the protection scope of this invention, is not applicable, but rather a merely explanatory and illustrative intention of the basic conception on which the same is based.

It is clarified that, in all figures, equal reference numbers and characters are in correspondence with equal or constitutive parts or elements in the assembly, according to the example chosen to explain the invented electro-pneumatic installation applied to seeders.

DETAILED DESCRIPTION OF A PREFERRED EXAMPLE

Figure 1:
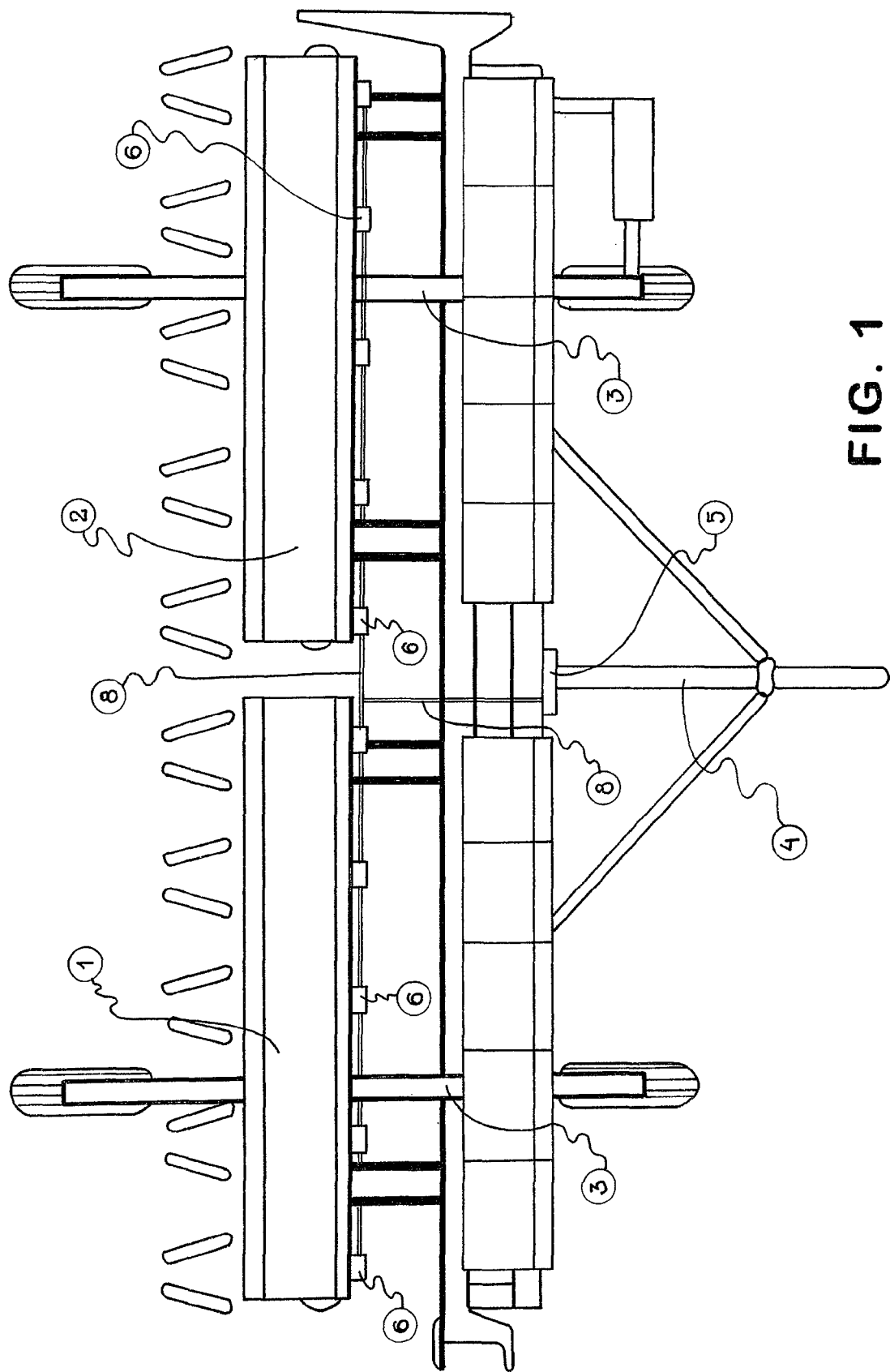
FIG. 1 is a schematic plan view representing a tow type seeder provided with an electro-pneumatic installation such as the one covered by the present invention.

As may be seen in FIG. 1, the electro-pneumatic installation referred to in the present invention is suitable for being applied on a tow type seeder such as the one that is schematically represented, of the type comprising seeding bodies 1 and 2 mounted on a support frame defined over a chassis—3, wherefrom a drawbar 4 projects for its connection and coupling to the tow tractor.

As previously explained, the installation comprises a command central unit 5 linked to an electric power source (not shown), intended to control the operation of units 6, generating the pneumatic current, vacuum or pressure, arranged one by one adjacent to each pneumatic seed dosing device to provide the pneumatic fluid used by each dosing device to achieve the ejection of the seeds discharged during the machine forward movement in order.

In the figures it is noted that all said motor suction or motor compressor units 6 are maintained integrated to the same electric circuit 8 stretching out from said command central unit 5, through which the respective electric motors generating the individual pneumatic action performed by each unit are fed.

The command arising from said central unit 5 may be individual and independent for each unit 6, or else, it may be collective in order to control the operation of all units on a simultaneous basis.

It is pointed out that based on the same constructive and functional conception, this invention envisages that the aforesaid electro-pneumatic units 6 may be either electric motor compressors, capable of generating the pneumatic pressure required by a specified seed dosing device model—7; or the same units 6 may be motor suction units, capable of producing vacuum within the body of another type of seed dosing device 7 wherein suction or vacuum is required.

Figure 2:
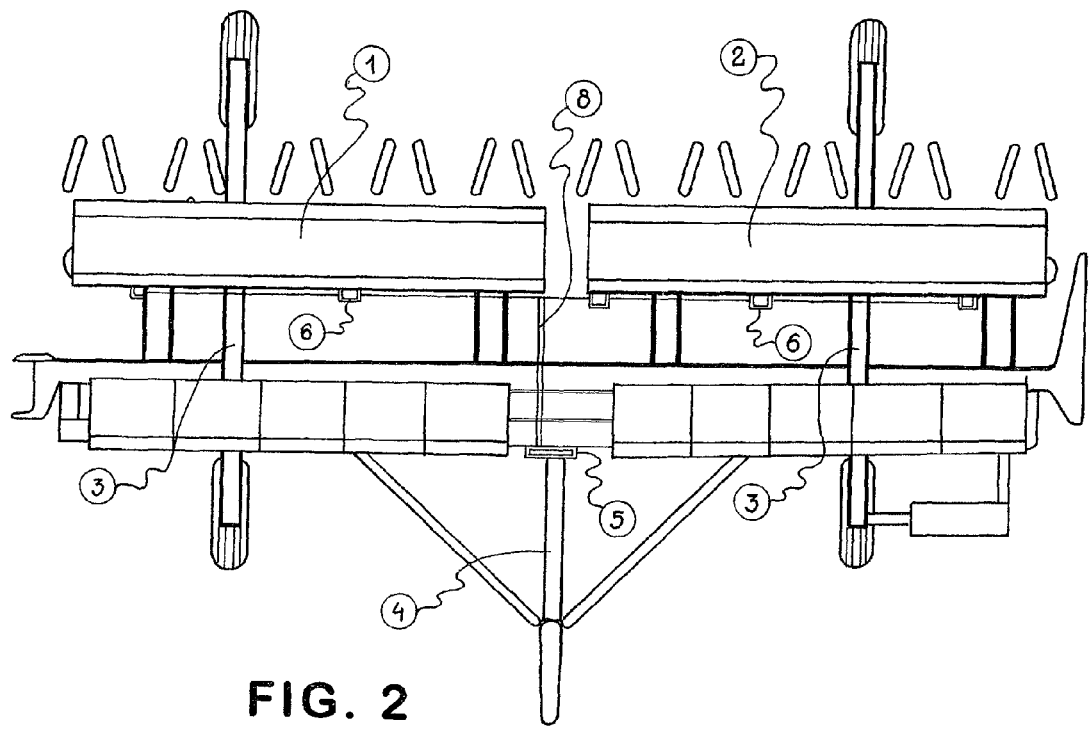
FIG. 2 is also a plan view similar to the previous figure, showing in this case one of the possible motor suction or motor compressor arrangements that integrate the invented electro-pneumatic installation.

Looking now at FIG. 2, the case wherein electro-pneumatic units 6 are used per each pair of seed dosing devices is illustrated, since the size of the seeder or the type of grain sowed, or the distance among furrows, allows so.

Figure 3:
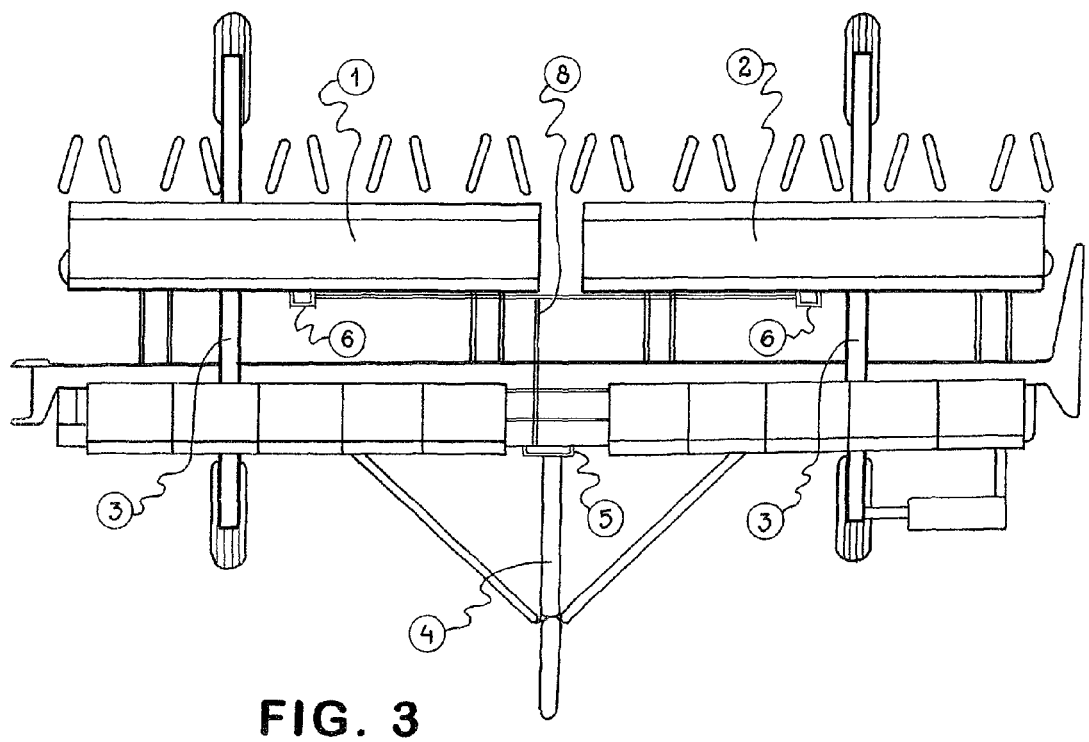
FIG. 3 is also a plan view similar to the previous figure, in this case showing one of the possible motor suction or motor compressor arrangements integrating the invented electro-pneumatic installation.

FIG. 3 shows the case wherein one electro-pneumatic unit 6 is used for each seeding body 1 and 2, this being another feasible constructive option within the same operation principle defined by the invented installation.

Figure 4:
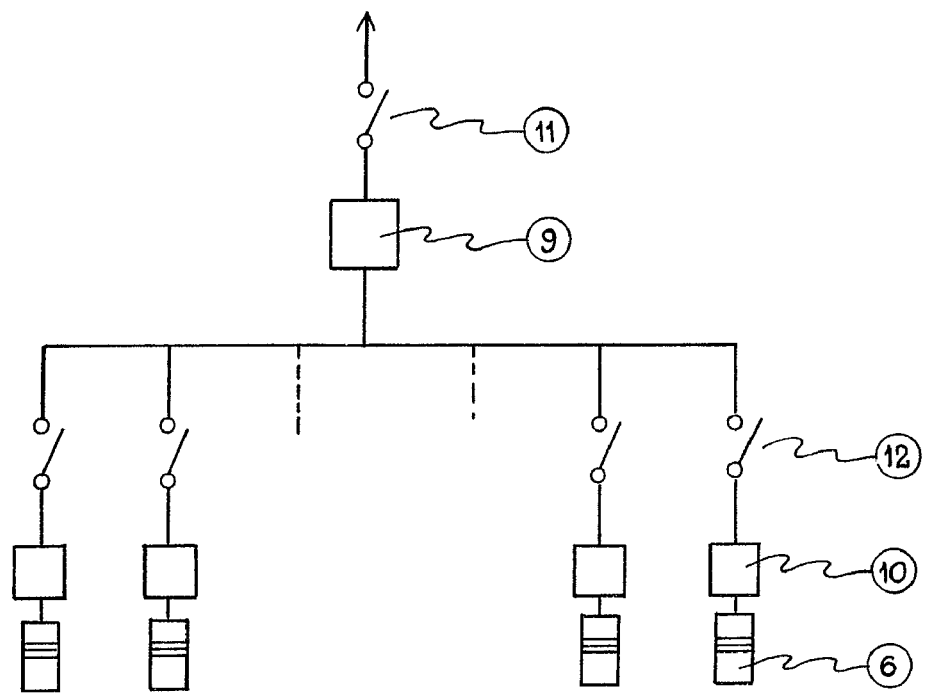
FIG. 4 is a schematic diagram representing the basic electric circuit suitable to be used for the motor suction or motor compressor command integrating the invented installation.

If we now see FIG. 4, we may understand the design of the command electric circuit wherein the central unit 5 is a tension regulator 9 having an electric circuit through which the individual action of each control unit 10 individually associated to each unit 6 is controlled, regulating the flow and suction pressure through a motor suction unit when vacuum suction takes place, or else, regulating the flow and pneumatic pressure through a motor compressor.

The circuit includes a general interrupter means 11 envisaged for those cases wherein disconnection of the whole installation, the above mentioned electronic regulator 9, a corresponding interrupter per furrow 12 sandwiched before each control unit per furrow 10 controlling the movement of each motor suction or motor compressor unit 6, is required.

Figure 5:
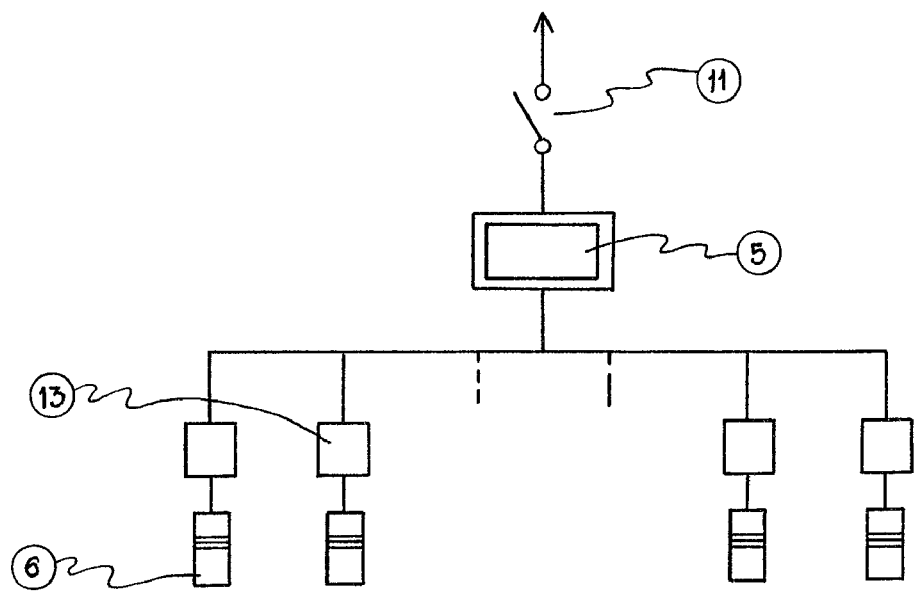
FIG. 5 is a schematic diagram representing another electric circuit suitable for the motor suction or motor compressor command integrating the invented installation.

FIG. 5 shows the case wherein the above mentioned electronic command central unit 5 has a microprocessor programmed through a "specific software" to control the movement of each motor suction or motor compressor unit 6, that monitors seeds falling into the furrow, on the basis of the information provided by remote control units 13.

The invention claimed is:

1. An agricultural seeding machine comprising:
   a minimum of one seeding body;
   a minimum of one seeding dosing devices associated with each seeding body;
   the seeding bodies mounted on a support frame over a chassis;
   a central command unit;
   a minimum of one individual control unit for each seeding body;
   the individual control units controlling the seeding dosing devices;

the central command unit connected to an electric power source; and the central command unit controlling the individual control units;

wherein the individual control units associated to the seed dosing device is a motor compressor unit.

2. An ELECTROPNEUMATIC INSTALLATION APPLIED TO SEEDERS, according to claim 1, wherein the electro-pneumatic unit is associated to all dosing devices having a seeding body of the seeder.

3. An ELECTROPNEUMATIC INSTALLATION APPLIED TO SEEDERS, according to claim 1, wherein the electro-pneumatic unit is associated to pairs of dosing devices within the seeder.

4. An agricultural seeding machine according to claim 1, wherein the individual control unit is individually associated to each seed dosing device within the seeder.

5. An agricultural seeding machine according to claim 4 wherein the central command unit is an electronic microprocessor.

6. The ELECTROPNEUMATIC INSTALLATION APPLIED TO SEEDERS, according to claim 1, wherein the general command central unit is a voltage regulator controlling the individual control units associated to the pneumatic dosing devices in order to increased or decrease the pneumatic action they perform.

7. An agricultural seeding machine according to claim 1, wherein the central command unit is an electronic microprocessor which controls the operation of the individual control units associated to the seeding dosing devices.

* * * * *